UNITED STATES PATENT OFFICE.

ARTHUR S. HOYT, OF NEW YORK, N. Y., ASSIGNOR TO THE ARTHUR S. HOYT COMPANY, OF NEW YORK, N. Y., A CORPORATION OF NEW YORK.

ARTICLE OF MANUFACTURE.

1,148,454.   Specification of Letters Patent.   Patented July 27, 1915.

No Drawing.   Application filed December 26, 1914.   Serial No. 879,042.

*To all whom it may concern:*

Be it known that I, ARTHUR S. HOYT, a citizen of the United States, residing in the borough of Manhattan, city of New York, in the county of New York and State of New York, have invented a certain new and useful Article of Manufacture, of which the following is a specification.

This invention relates to a new article of manufacture, namely, a novel product, the result of a novel process in the treatment of the starchy content of wheat flour or the like, whereby there is produced a powder which, by the mere addition of water, is rendered fit for immediate application to clothes in their treatment in the laundry.

The present laundry starch of commerce consists of the heavier particles of the material which separates out from the starch water in the treatment of the dough. It is more or less mixed with albumen and albuminous materials. After the separation referred to it is heated and dried and crystalizes more or less. When it is desired to use such starch for laundry purposes, that is, for the stiffening of the fabric, water is added to it which penetrates between its particles to form a paste and it is then cooked, forming an opalescent jelly, which is applied to the clothes which are dried usually by the application of heat and they are then subjected to the ironing process, during which the starch is again heated.

Each time starch is heated it loses some of its strength or stiffening power, and it is therefore desirable not to heat it oftener than necessary, and it has long been desirable to find some way by which one or more of the heatings referred to could be omitted.

In the preparation of the starch of commerce for laundry use it has been found practically impossible to secure any uniformity in the condition and character of the starch jelly made at different times. That is, the inevitable changes in circumstances of cooking, the amount and quality of the water, the varying degrees of heat, and of water, for instance a deficiency of water when dry cooking is employed, and an excess of water when steam is employed, and other circumstances which are apt to vary, cause practically every batch of starch produced in the laundry to be different from every other. This lack of uniformity results in a relatively great expense to the laundryman because in practically every lot of clothes submitted to him for treatment the lack of uniformity in the starch results in the bad starching of clothes which are not properly stiffened and causes the production of what are known in the trade as "wash-overs", that is, clothes which have to be washed over again and newly treated with starch in order to bring them to a merchantable condition. If it were not for the occurrence of "wash-overs" the laundry man could almost always safely promise the delivery of the laundried clothes in one-half the time which he now has to demand in order to be sure to have time enough to treat the "wash-overs". In addition, owing to the uncertainty in the production of a suitable character of starch jelly in any one batch, it is always necessary to make more than the quantity actually necessary, and this excess can not be saved for further use, for owing, it is presumed, to its albuminous content, the water separates out and the material spoils. Therefore, the lack of standard quality in the starch jelly produced results in a relative serious economic loss of time, money and material.

I have discovered that by removing the greater portion or the whole of the albumen from the starch and cooking it before it is jellified and reducing the resultant solid material to a finely divided state I produce a powder which, by the mere addition of water, cold or warm, is converted into a starch jelly suitable for immediate application to the fabrics to be stiffened and which is of unusual strength as compared with the starch of commerce. It is of standard uniform quality and its use results in the elimination of "wash-overs", removes the need for making more starch jelly when necessary and it makes a jelly which does not spoil when kept. On account of the fact that the starch has not been heated as often as usual in the production and use of the laundry starch of commerce its stiffening power or strength is much greater.

The process of making my novel product forms the subject matter of an application for Letters Patent of the United States, Serial No. 879,041 filed by me December 26, 1914 and much that is said therein must be repeated here.

In the manufacture of starch from wheat flour where the processes employed are principally mechanical, the flour is first kneaded into a paste with water. After allowing this to remain in this condition for a short time, one or two hours for example, it is washed through a sieve whereby the starch is separated and the insoluble gluten of the flour remains upon the sieve in the form of an adhesive mass. The washing of the dough is continued until the water ceases to be milky from the presence of the starch washed out of it. There is thus secured a body of water containing particles of starch in suspension. A condensation or further separation of the starch is then secured, either by allowing it to settle in suitable tanks in which the heavier particles slowly collect at the bottom and the lighter particles remain in suspension in the supernatant liquid, or it is treated in centrifugal machines in which the heavier particles are driven to the circumference and the lighter particles collected at the center of the apparatus.

The usual starch of commerce consists of the material which settles at the bottom of tanks of the character described, or is secured from the circumference of the centrifugal machines. Such starch always contains a noticeable amount of albumen or albuminous materials mixed therewith. The water contained in the starchy mass is removed in a number of ways well known to the art which it is not necessary to describe, but after the water has been substantially removed the mass is placed in heated drying chambers wherein it slowly becomes crystallized and is then put into packages to be dispensed to the trade.

In carrying out my process I take the starch mixed with water as it comes from the settling tanks or from the centrifugal machines above described and treat it so as to remove the whole or greater part of its albuminous content. This may be done in various ways but the one which I prefer is to place the material in another centrifugal with a plentiful quantity of water, and which centrifugal has suitable apertures at its rim. Upon operating the device the water passes out through these apertures carrying with it the bulk of the albuminous particles and leaving behind, clinging to the inner periphery of the apparatus, the mass of the refined or purified starch. It may be that this treatment a single time will suffice to remove the albumen, but in practice I have found that it is advisable to subject the starch to a second treatment of substantially the same nature. The purified starch is then treated to remove the bulk of the water therefrom. This may be accomplished by any suitable mechanical means such as filtration or settling, enough of the water being left to insure its cooking without burning. The residue is then cooked in any usual manner, but the manner which I prefer is to place the material in a digester or cooker to which heat may be applied in any suitable manner until, under the action of heat, transparency or translucency ensues and the starch has been converted into the form of an opalescent jelly. I next dry this jelly in any suitable manner. One manner which I prefer is to bring the material into contact with rollers heated by steam in any usual manner so as to spread it over a large surface and to economize the amount of heat which needs to be employed to accomplish the desired result. It is removed from the roller in the form of flakes and may, if desired, be reduced to powder in any suitable manner. When the powder is to be used a suitable quantity is treated with either cold, or preferably slightly warm, water until it again assumes the character of an opalescent jelly and it is ready for use. It should be noted that one heating of the starch is avoided by taking it directly from the separation tanks or centrifugals before it is dried or allowed to crystallize, and that no heating is required of the powder to make it available for use, thus effecting an economy also at that stage of its use.

What I claim is:

1. A new article of manufacture consisting of the starch from wheat flour or the like, from which the bulk of the naturally occurring albuminous materials have been removed, cooked and dried, and consisting of converted starch substantially free from albumen.

2. A new article of manufacture consisting of the starch from wheat flour or the like, from which the bulk of the naturally occurring albuminous materials have been removed, cooked and dried, and reduced to powder and consisting of converted starch capable of forming an opalescent jelly by the addition of water.

In testimony whereof I affix my signature in presence of two witnesses.

ARTHUR S. HOYT.

Witnesses:
    MARY H. LEWIS,
    ALDA L. MILLER.